US009205287B2

(12) United States Patent
Castanha et al.

(10) Patent No.: US 9,205,287 B2
(45) Date of Patent: Dec. 8, 2015

(54) PASSENGER INTERFACE SYSTEM AND ASSEMBLY THEREOF

(71) Applicant: EMBRAER S.A., São José dos Campos-SP (BR)

(72) Inventors: Bruno Kimura Castanha, São José dos Campos SP (BR); Fernando Henrique Da Silva, São José dos Campos SP (BR); Celso Aparecido Cruz Gueiros, São José dos Campos SP (BR); Jay Beever, Melbourne, FL (US); Oliver Turci De Camargo, São José dos Campos SP (BR); Joshua Rea, Melbourne, FL (US); Rainer Zierer, Melbourne, FL (US)

(73) Assignee: EMBRAER S.A., São José dos Campos-SP (BR)

( * ) Notice: Subject to any disclaimer, the term of this patent is extended or adjusted under 35 U.S.C. 154(b) by 42 days.

(21) Appl. No.: 14/259,929

(22) Filed: Apr. 23, 2014

(65) Prior Publication Data

US 2015/0016129 A1    Jan. 15, 2015

Related U.S. Application Data

(60) Provisional application No. 61/824,733, filed on May 17, 2013.

(51) Int. Cl.
| B64D 47/02 | (2006.01) |
| B64F 1/20 | (2006.01) |
| F21V 1/20 | (2006.01) |
| F21V 21/00 | (2006.01) |
| A62B 25/00 | (2006.01) |
| B64D 11/00 | (2006.01) |
| A62B 7/14 | (2006.01) |
| A62B 18/02 | (2006.01) |
| B64D 13/00 | (2006.01) |

(52) U.S. Cl.
CPC .............. *A62B 25/005* (2013.01); *A62B 7/14* (2013.01); *A62B 18/02* (2013.01); *B64D 11/00* (2013.01); *B64D 47/02* (2013.01); *B64D 2011/0038* (2013.01); *B64D 2011/0053* (2013.01); *B64D 2013/003* (2013.01)

(58) Field of Classification Search
CPC .......... A62B 25/05; A62B 7/14; A62B 18/02; B64D 11/00; B64D 47/02
USPC ...................... 362/23.09–23.13, 23.16–23.2, 362/470–472, 509, 512, 514–515, 523, 528, 362/530, 547–549
See application file for complete search history.

(56) References Cited

U.S. PATENT DOCUMENTS

2007/0057121 A1* 3/2007 Callahan et al. ........... 244/118.5
2010/0096919 A1* 4/2010 Meckes et al. ................ 307/9.1

*Primary Examiner* — Jason Moon Han
(74) *Attorney, Agent, or Firm* — Nixon & Vanderhye P.C.

(57) ABSTRACT

Passenger interface units include individual passenger modules having co-located controls for passenger comfort and entertainment systems. The modules will include a glass panel having front and rear surfaces, a structural support panel bonded to the rear surface of the glass panel and a light-emitting unit supported by the support panel behind the rear surface of the glass panel. The rear surface of the glass panel may include an opaque printed coating layer having at least one unpainted region that is transparent to visible light emitted by the light-emitting unit thereby allowing the visible light to be transmitted through the glass panel and visible at the front surface thereof.

15 Claims, 2 Drawing Sheets

PASSENGER INTERFACE SYSTEM AND ASSEMBLY THEREOF

CROSS-REFERENCE TO RELATED APPLICATIONS

Figure 1:
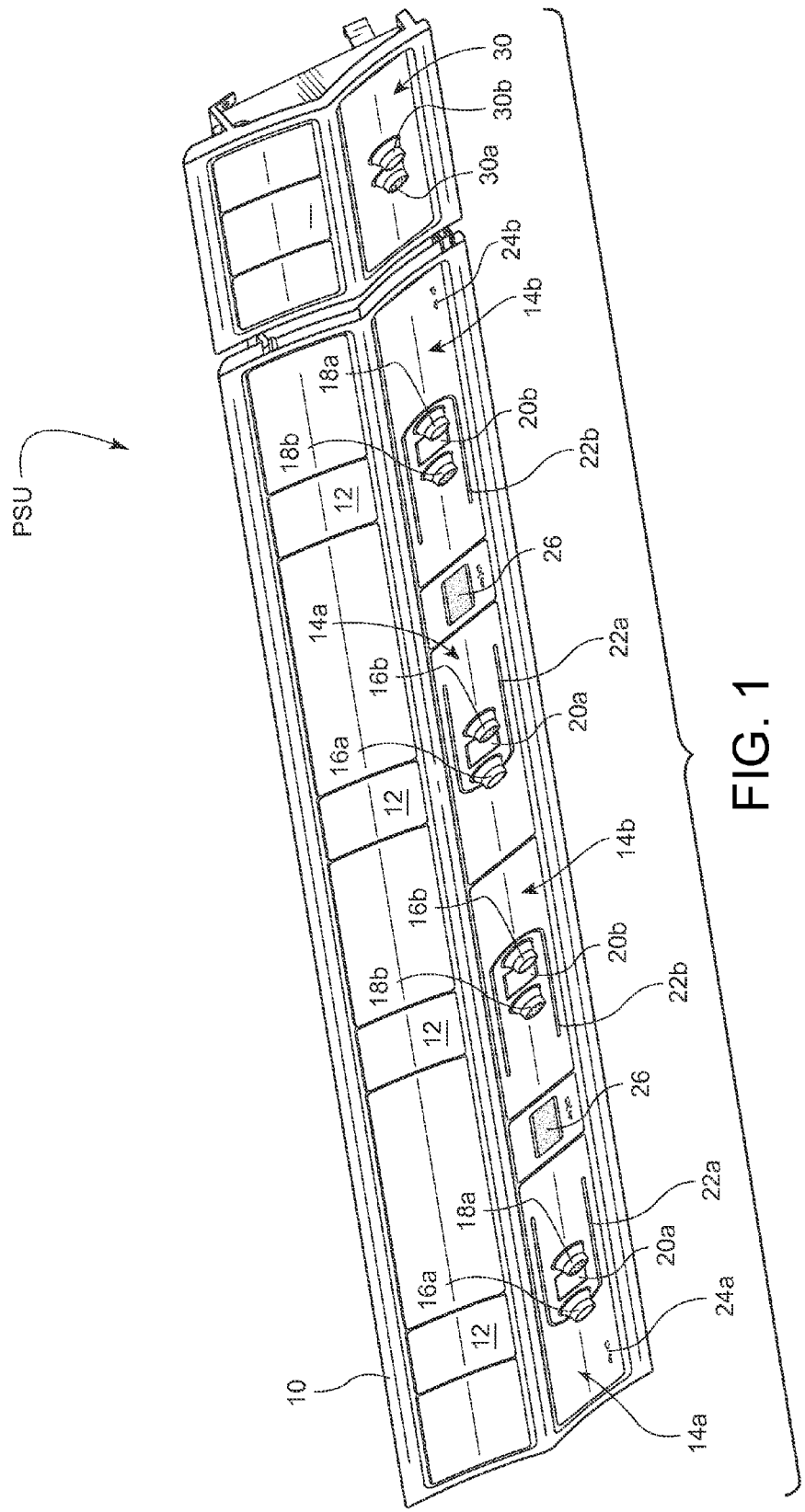

This application is based on and claims domestic priority under 35 USC §119(e) to U.S. Provisional Application Ser. No. 61/824,733 and is related to commonly owned U.S. Design Patent Application No. 29/455,208, each being filed on filed on May 17, 2013, the entire contents of each such prior filed application being expressly incorporated hereinto by reference

FIELD

The embodiments disclosed herein relate generally to passenger interface systems employed in interiors of transport vehicles, especially aircraft interior cabins.

BACKGROUND

The traditional Passenger Service Units (PSUs) for executive transport aircraft typically comprise an individual assembly that merges the functions of providing the passenger with an overhead reading light and an air outlet. Usually the PSUs are set apart by concealed compartments containing either an oxygen mask (that by certification is also required to be available to each individual passenger) or a speaker (which allows the passenger to hear audio from the on-board PA or personal entertainment systems). Sometimes, the PSU will be provided with a screen or monitor for displaying images associated with a GPS-driven "moving map" of the aircraft route or video images associated with the passenger's in-flight entertainment system (e.g., movies, games and the like). Traditionally, the moving map and the in-flight entertainment system share the same screen or monitor. Thus, in order to change from one screen input to another, the passenger will need to operate a hand-held controller that is within reach.

In typical executive aircraft interior configurations, the reading light, air vent and oxygen masks are located in an overhead console while the personal screen associated with in-flight entertainment systems are located in front of or at the side of the passenger's seat to provide optimum viewing angles. The controls for all such systems are thus typically distributed about the passenger in different locations such that navigation between all systems requires different switches and controls. These distributed controls for the various passenger-operated comfort and entertainment systems therefore can result in an undesirable travel experience for the passenger.

What has been needed in this art, therefore, is a more unified control of on-board passenger comfort and entertainment systems. It is towards fulfilling such a need that the embodiments of the present invention are directed.

SUMMARY

In general, the embodiments disclosed herein are directed toward passenger interface units comprised of individual passenger modules having co-located controls for passenger comfort and entertainment systems. According to some embodiments, the modules will include a glass panel having front and rear surfaces, a structural support panel bonded to the rear surface of the glass panel and a light-emitting unit supported by the support panel behind the rear surface of the glass panel. The rear surface of the glass panel may include an opaque printed coating layer having at least one unpainted region that is transparent to visible light emitted by the light-emitting unit thereby allowing the visible light to be transmitted through the glass panel and visible at the front surface thereof.

According to certain embodiments, the light-emitting unit comprises a touch screen unit supported by the support panel behind (and in some embodiments in contact with) the rear surface of the glass panel. Such embodiments will be provided with a support panel having a touch screen cut-out region sized and configured to allow the touch screen unit to be positioned therein such that the touch screen unit is in contact with the rear surface of the glass panel. The opaque printed coating layer will thus have an unpainted transparent region that is in registry with the touch screen cut-out region.

Other embodiments may include a reading light unit and an air vent unit. In such embodiments, the glass panel and the support panel will have respective registered reading light and air vent cut-out regions to accommodate the reading light and air vent units therein so that each protrudes outwardly from the front surface of the glass panel to allow manual manipulation and access by the passenger.

According to certain embodiments, the light-emitting unit will comprise an accent lighting unit for providing visible accent light through the glass panel. In such embodiments, the support panel will include an accent lighting unit cut-out region for accommodating at least a part of the accent lighting unit and the opaque printed coating layer will comprise an unpainted transparent accent lighting unit window in registry with the accent lighting unit cut-out region of the support panel. In such a manner, visible light emitted by the accent lighting unit will be visibly perceived from a front surface of the glass panel.

According to other embodiments, the light-emitting unit may comprise an advisory lighting unit. In such embodiments, the printed opaque layer includes an advisory window comprised of indicia corresponding to desired passenger advisory information when illuminated by the advisory lighting unit. The support panel will thus include an advisory light unit cut-out region sized and configured to allow the advisory light unit to be positioned therein such that the advisory light unit is supported by the support panel behind (and in some embodiments in contact with) the rear surface of the glass panel.

Passenger interface units may include multiple modules, e.g., pairs of mirror image modules. In preferred embodiments, the passenger interface units will be employed in an aircraft cabin. In such embodiments, the passenger service unit may include a valence which houses at least one oxygen mask for delivery of oxygen to a passenger, and a removable panel covering the oxygen mask.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
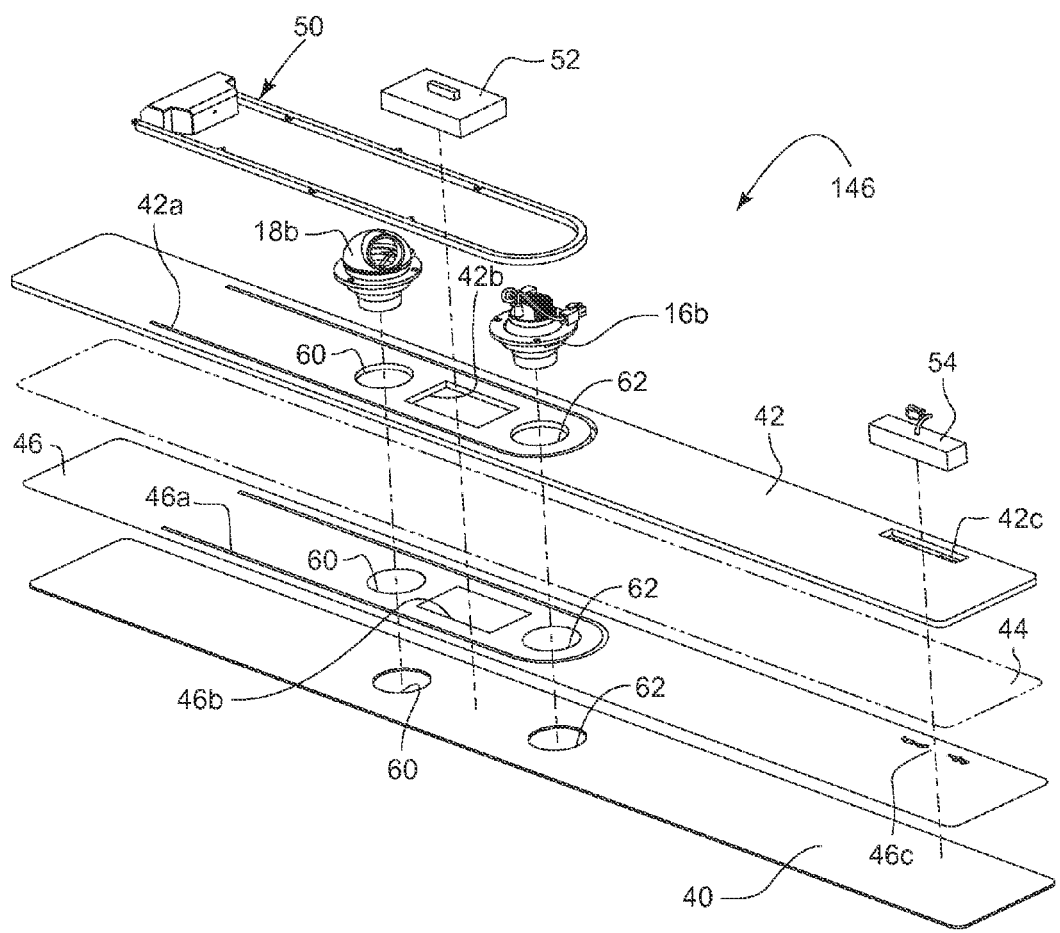

The disclosed embodiments of the present invention will be better and more completely understood by referring to the following detailed description of exemplary non-limiting illustrative embodiments in conjunction with the drawings of which:

FIG. 1 is a front perspective view of an overhead aircraft interior valence which includes a passenger interface system according to an embodiment of the invention; and FIG. 2 is an exploded rear perspective view of a passenger interface module employed in the system depicted in FIG. 1.

DETAILED DESCRIPTION

Accompanying FIG. 1 depicts a front perspective view (i.e., as viewed by a passenger) of a passenger service unit PSU provided in an overhead valence assembly 10. The valence assembly 10 provides a housing structure to contain oxygen masks (not shown) behind removable panels 12. As is conventional, should the need arise to supply passengers with oxygen (e.g., in case of aircraft depressurization), the oxygen masks can be deployed by the automated release of the panels 12.

The valence 10 of the PSU also contains pairs of passenger interface units 14a, 14b in accordance with an embodiment of the present invention. As will be observed in the depicted embodiment, the units 14a, 14b are generally mirror images of one another for aesthetics but each respectively provides for co-located control units including a reading light unit 16a, 16b, an air vent unit 18a, 18b and a touch screen unit 20a, 20b positioned therebetween. An accent light 22a, 22b may also be provided in each of the modules 14a, 14b, respectively, so as to highlight the passenger-controlled reading light units 16a, 16b, air vent units 18a, 18b and touch screen units 20a, 20b. In the depicted embodiment, the accent light 22a, 22b is in the form of a generally elongated U-shaped lighting trace to provide suitable aesthetics as well as functional illumination of the co-located control units. Selected ones of the passenger interface units 14a and/or 14b may also be provided with advisory indicators 24a, 24b (e.g., signage and/or indicia which advises the passenger of certain in-flight requirements such as no smoking, seat belt use and the like).

In the embodiment depicted, the modules 14a, 14b are separated from one another by an audio speaker unit 26 which may provide audio output from the on-board passenger address and on-board entertainment systems.

The PSU may also be provided with an auxiliary passenger interface unit 30 which unlike the unit 10 does not include a module 14a or 14b, but instead may include only a reading light unit 30a and an air vent unit 30b. The passenger interface unit 30 may be provided in those instances where spatial constraints dictate that less functionality is required.

Accompanying FIG. 2 depicts an exploded rear perspective view of a representative module 14b, it being understood that the module 14a is substantially identical to but a mirror image of the depicted module 14b. As is shown, the module 14b is a laminated structure comprised primarily of a rigid exterior glass panel (preferably high ion exchange glass panel, e.g., HIE™ glass commercially available from Abrisa Technologies) panel 40 which is bonded to an interior composite support panel 42 by way of a suitable adhesive layer (schematically depicted by the double dash line identified by reference numeral 44 in FIG. 2). According to preferred embodiments, the glass panel 40 may have a thickness in the range of about 0.1 mm to about 2.0 mm, preferably about 1.0 mm. The interior composite support panel 42 may have a thickness in the range of about 3.0 mm to about 12.7 mm, preferably about 6.35 mm.

The back surface of the glass panel 40 includes an opaque painted coating layer (schematically depicted by reference numeral 46) which masks visible light except in those unpainted (and hence light transparent) regions corresponding to a generally elongate U-shaped accent light window 46a, a touch screen window 46b and an advisory light window 46c. Each of the windows 46a, 46b and 46c are thus aligned with am accent lighting unit 50, a touch screen unit 52 and an advisory light unit 54 mounted physically to the support panel 42 in cut out regions 42a, 42b and 42c, respectively. In a similar manner, the glass panel 42 (and the painted layer 46 thereon) and the support panel 42 are provided with aligned cut-out regions 60 and 62 therein so as to permit the mounting of the air vent and reading light units 18b, 16b, respectively. In such a manner, therefore, the air vent and reading light units 18b, 16b will each protrude outwardly from the front surface of the glass panel 40 so as to be capable of physical manipulation and access by the passenger.

The accent light unit 50 may, for example, be an elongated strip of light-emitting diodes (LEDs) of desired color(s) that can be illuminated as desired to provide accent lighting to the interior cabin space in the vicinity of the passenger.

The touch screen unit 52 is in and of itself conventional and is either connected to or integrally includes a suitable processor for displaying control icons corresponding to the comfort and/or entertainment units that are subject to passenger control. Thus, for example, the touch screen unit 52 may display a menu of connected devices which can be touched to access submenus for further control of the selected device. The advisory light unit can simply be an on-off type of LED light illumination which can then be visibly perceived through printed indicia of the layer 46 via windows 46c thereby communication the desired passenger advisory information (e.g., no smoking, seat belt fastened and the like).

The touch screen unit 52 may be in the form of a monitor which provides quick feedback from the moving map or other summarized flight information (e.g., time to arrival, current location and/or flight data such as altitude ground speed and the like) without disrupting on-going entertainment. Alternatively (or additionally), the touch screen unit 52 may provide redundancy for the main function buttons in the cabin, such as the passenger's table light, reading light and flight attendant call button that is displayed on the unit 52 when activated by the unit's proximity sensor.

The support panel 42 is preferably a relatively light weight but high strength carbon and/or glass fiber-reinforced resin composite panel. The support panel 42 may itself be formed of a lightweight but stiff composite honeycomb core structure laminated to exterior composite skin layers.

The module 14b will thus be presented to the passenger as essentially a flat glass panel representing the front surface of the glass panel 40 through which the accent light provided by accent light unit 50, touch screen controls provided by the touch screen panel unit 52 and advisory indicators provided by the advisory light unit 54 are visible. Moreover the touch screen panel 52 may be controlled by the passenger by virtue of its operative interaction with the glass panel 40. In such a manner therefore, all of the controls for the on-board passenger comfort and entertainment systems may be co-located within the module 14b. That is, the controls for the light via light unit 16b, air volume via air vent 18b and entertainment systems (not shown) connected operatively to the touch screen unit 52 may be operated from the same location. As a result, the passenger's enjoyment of the travel experience can be heightened.

It will be understood that the description provided herein is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:

1. A module for a passenger interface unit for an overhead valence of an aircraft comprising:
a glass panel having front and rear surfaces;
a structural support panel bonded to the rear surface of the glass panel, and
a light-emitting unit supported by the support panel behind the rear surface of the glass panel to illuminate an interior of the aircraft, wherein
the rear surface of the glass panel includes an opaque printed coating layer having at least one unpainted region that is transparent to visible light emitted by the light-emitting unit thereby allowing the visible light to be transmitted through the glass panel and visible at the front surface thereof.

2. The module as in claim 1, wherein the light-emitting unit comprises a touch screen unit supported by the support panel behind the rear surface of the glass panel.

3. The module as in claim 2, wherein the support panel has a touch screen cut-out region sized and configured to allow the touch screen unit to be positioned therein such that the touch screen unit is positioned adjacent to the rear surface of the glass panel.

4. The module as in claim 3, and wherein the opaque printed coating layer has an unpainted transparent region that is in registry with the touch screen cut-out region.

5. The module as in claim 1, which further comprises a reading light unit and an air vent unit, wherein the glass panel and the support panel have respective registered reading light and air vent cut-out regions to accommodate the reading light and air vent units therein.

6. The module as in claim 1, wherein the light-emitting unit comprises an accent lighting unit for providing visible accent light through the glass panel.

7. The module as in claim 6, wherein the support panel comprises an accent lighting unit cut-out region for accommodating at least a part of the accent lighting unit.

8. The module as in claim 7, wherein the opaque printed coating layer comprises an unpainted transparent accent lighting unit window in registry with the accent lighting unit cut-out region of the support panel to allow visible light emitted by the accent lighting unit to be visibly perceived from a front surface of the glass panel.

9. The module as in claim 1, wherein the light-emitting unit comprises an advisory lighting unit, and wherein the printed opaque layer includes an advisory window comprised of indicia corresponding to desired passenger advisory information when illuminated by the advisory lighting unit.

10. The module as in claim 9, wherein the support panel includes an advisory light unit cut-out region sized and configured to allow the advisory light unit to be positioned therein such that the advisory light unit is supported by the support panel behind the rear surface of the glass panel.

11. A passenger interface unit which comprises a valence, and at least one module as in claim 1.

12. The passenger interface unit as in claim 11, wherein the valence houses at least one oxygen mask for delivery of oxygen to a passenger, and a removable panel covering the oxygen mask.

13. An aircraft which comprises an interior cabin and a passenger interface unit, wherein the passenger interface unit comprises at least one module as in claim 1.

14. The aircraft as in claim 13, wherein the passenger interface unit comprises a pair of modules.

15. The aircraft as in claim 14, wherein each module is a mirror image of an adjacent module.

* * * * *